United States Patent
Thomsen et al.

(10) Patent No.: US 10,641,248 B2
(45) Date of Patent: May 5, 2020

(54) TRANSPORT FRAMES FOR A WIND TURBINE BLADE

(71) Applicant: Vestas Wind Systems A/S, Aarhus N. (DK)

(72) Inventors: Peter Frans Thomsen, Ringkøbing (DK); Adrian Botwright, Sabro (DK); Troels Vahle, Grenaa (DK); Martin Damm, Aarhus N. (DK); Kristoffer Lolk Fredriksen, Aarhus N. (DK); Carsten Jasper, Aarhus N. (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 16/066,428

(22) PCT Filed: Dec. 23, 2016

(86) PCT No.: PCT/DK2016/050464
§ 371 (c)(1),
(2) Date: Jun. 27, 2018

(87) PCT Pub. No.: WO2017/114530
PCT Pub. Date: Jul. 6, 2017

(65) Prior Publication Data
US 2019/0010929 A1    Jan. 10, 2019

(30) Foreign Application Priority Data
Dec. 30, 2015   (GB) .................................. 1523122.8

(51) Int. Cl.
*F03D 13/40*    (2016.01)
*F03D 13/10*    (2016.01)

(52) U.S. Cl.
CPC .............. *F03D 13/40* (2016.05); *F03D 13/10* (2016.05); *F05B 2260/02* (2013.01); *Y02E 10/72* (2013.01)

(58) Field of Classification Search
CPC .......... F03D 13/40; F03D 80/00; F03D 13/10; F03D 13/20; F03D 1/00; F03D 1/0675; F03D 80/50
(Continued)

(56) References Cited

U.S. PATENT DOCUMENTS 2,727,758 A * 12/1955 Smith ....................... B60P 3/40
                                                    280/656
7,591,621 B1 * 9/2009 Landrum .................. B60P 3/40
                                                    410/44

(Continued)

FOREIGN PATENT DOCUMENTS

EP    2620389 A1    7/2013
EP    2708731 A2    3/2014
(Continued)

OTHER PUBLICATIONS

European Patent Office, International Search Report and Written Opinion in PCT/DK2016/050464, dated Mar. 31, 2017.
(Continued)

*Primary Examiner* — D Glenn Dayoan
*Assistant Examiner* — Sunsurraye Westbrook
(74) *Attorney, Agent, or Firm* — Wood Herron & Evans LLP

(57) ABSTRACT

Transport frame pair configured for transporting a wind turbine blade, said frame pair comprising a tip frame and a root frame, each said tip and root frame being stackable with identical frames for blade transport or storage, each one of said tip and root frame comprising four upright frame struts which together define a generally cuboid internal space (Continued)

having a longitudinal extent between two pairs of said upright struts; said tip frame comprising a tip saddle assembly within said generally cuboid internal space, and said root frame comprising a root saddle assembly within said generally cuboid internal space, and wherein said root frame is configured to prohibit a translation movement of said root saddle assembly in a longitudinal direction of a blade supported in a root saddle of said root saddle assembly; and wherein said tip frame allows a translation movement of said tip saddle assembly in a longitudinal direction of a blade supported in a tip saddle of said tip saddle assembly. The longitudinal extent of the root frame may be more than twenty percent greater than the longitudinal extent of the tip frame.

17 Claims, 5 Drawing Sheets

(58) Field of Classification Search
USPC ........ 410/44, 45, 120, 2, 47, 80, 34, 49, 98, 410/97, 91, 87, 82, 54; 414/800, 470, 414/139.4, 458, 460, 485, 624, 910, 803; 280/789, 781, 140–148, 656, 763.1
See application file for complete search history.

(56) References Cited

U.S. PATENT DOCUMENTS

| | | |
|---|---|---|
| 7,670,090 B1 | 3/2010 | Landrum et al. |
| 8,353,523 B2 * | 1/2013 | Pedersen ............... B60P 3/40 280/404 |
| 9,434,291 B2 * | 9/2016 | Kelly ................ B60P 3/40 |
| 9,638,162 B1 * | 5/2017 | Fletcher ............... B61D 45/003 |
| 2007/0189895 A1 | 8/2007 | Kootstra et al. |
| 2009/0274529 A1 | 11/2009 | Broderick et al. |
| 2010/0252977 A1 * | 10/2010 | Jorgensen ............... F03D 13/40 269/287 |
| 2011/0131785 A1 | 6/2011 | Madsen |
| 2013/0343827 A1 | 12/2013 | Schibsbye et al. |
| 2015/0028608 A1 | 1/2015 | Wubbelmann |
| 2015/0283934 A1 | 10/2015 | Kern |
| 2015/0329036 A1 | 11/2015 | Johnson et al. |

FOREIGN PATENT DOCUMENTS

| | | |
|---|---|---|
| EP | 2796709 A1 | 10/2014 |
| JP | 2012523342 A | 10/2012 |
| KR | 20090066900 A | 6/2009 |
| WO | 2010034732 A1 | 4/2010 |
| WO | 2011009538 A2 | 1/2011 |
| WO | 2011098086 A1 | 8/2011 |
| WO | 2012048719 A1 | 4/2012 |
| WO | 2014111093 A1 | 7/2014 |
| WO | 2015149809 A1 | 10/2015 |

OTHER PUBLICATIONS

Intellectual Property Office, Search Report in GB1523122.8, dated Jul. 7, 2016.
China National Intellectual Property Administration, First Notification of Office Action in CN Application No. 201680082703.0, dated Jul. 29, 2019.
Japanese Patent Office, Notice of Reasons for Refusal in JP Application No. 2018-534845, dated Sep. 17, 2019.

* cited by examiner

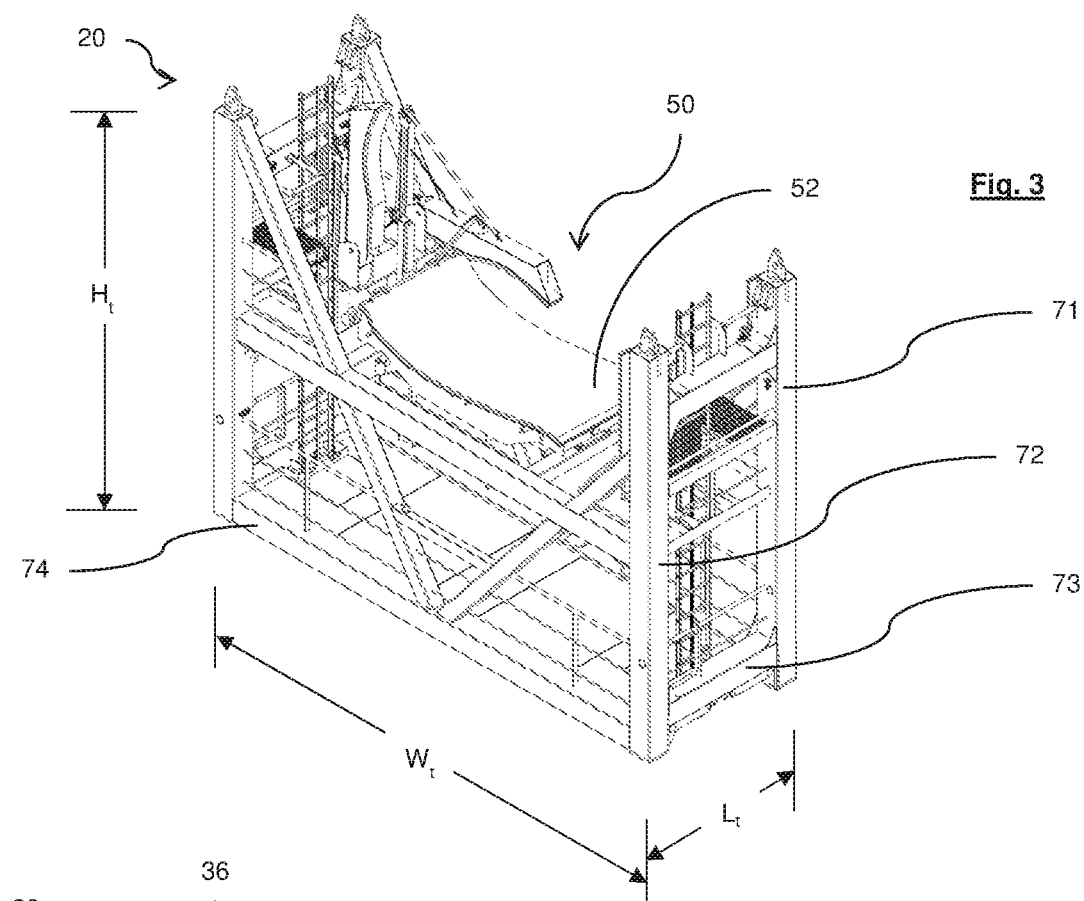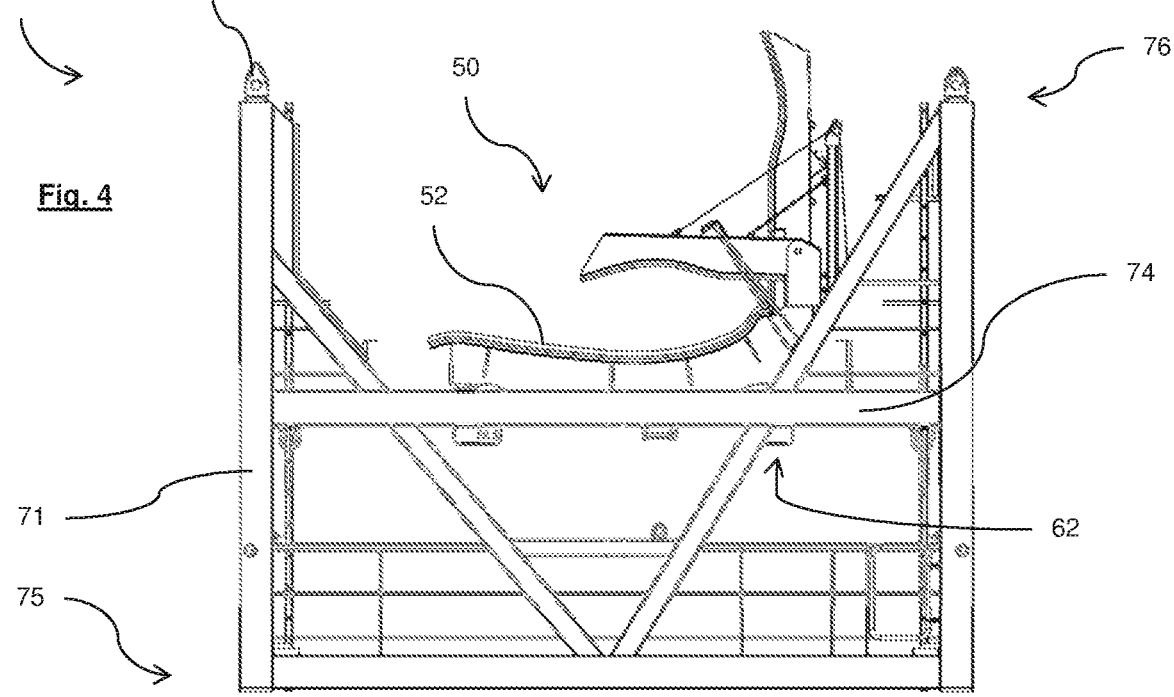

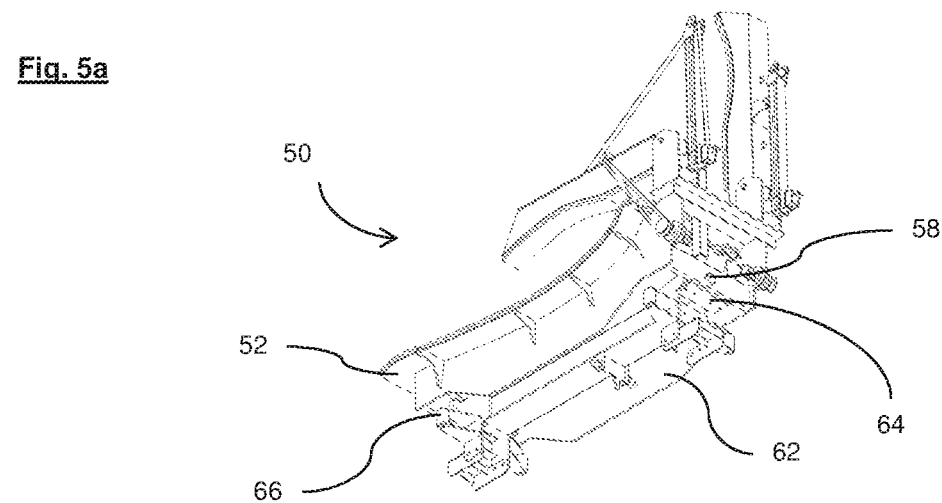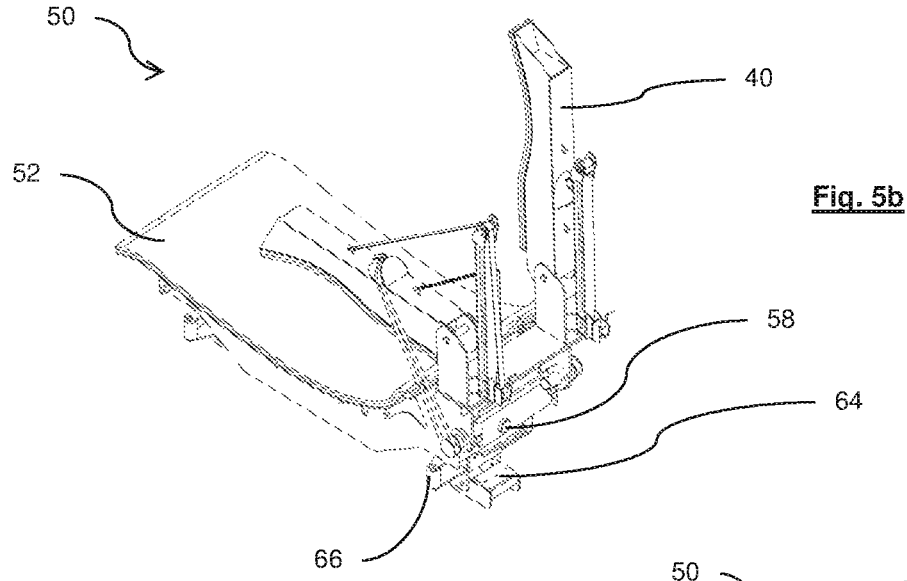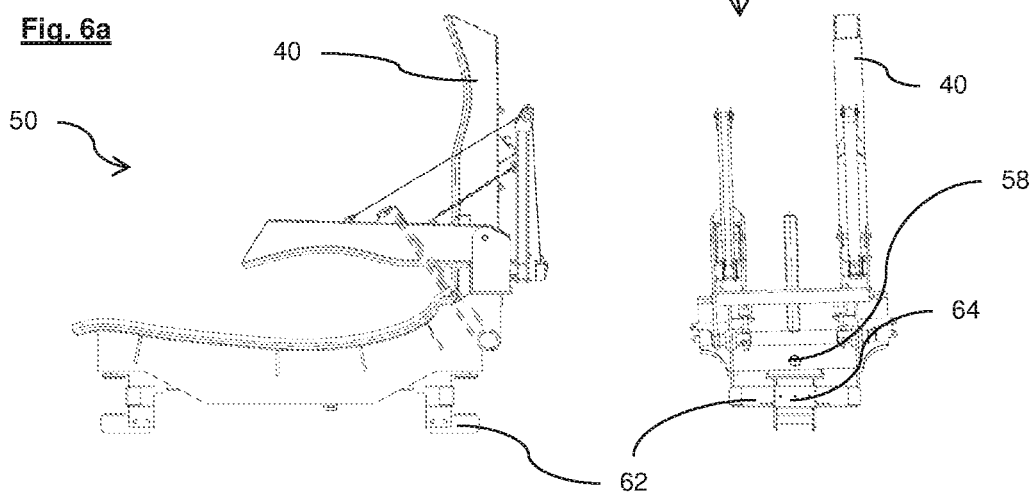

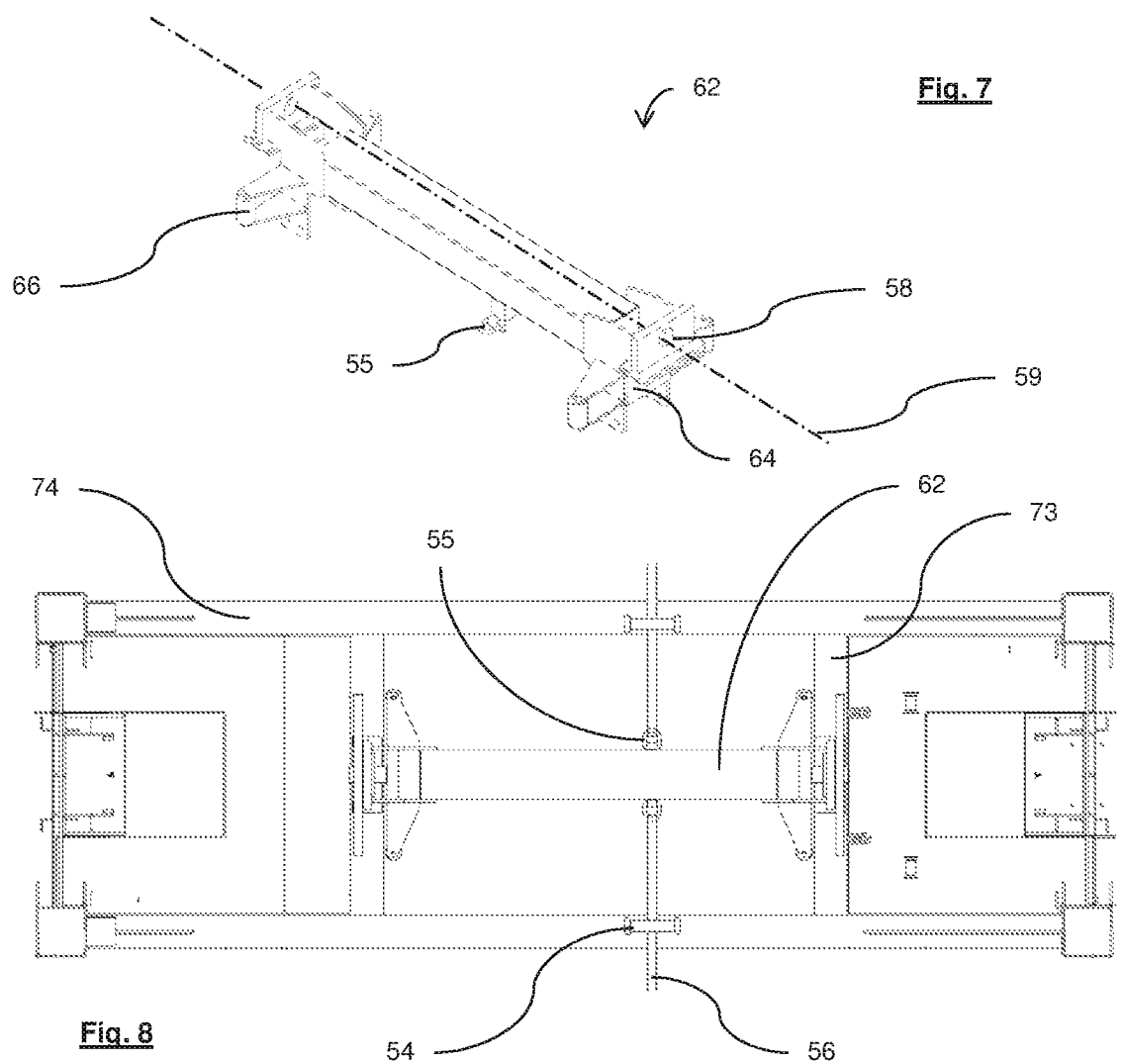
Fig. 7
Fig. 8
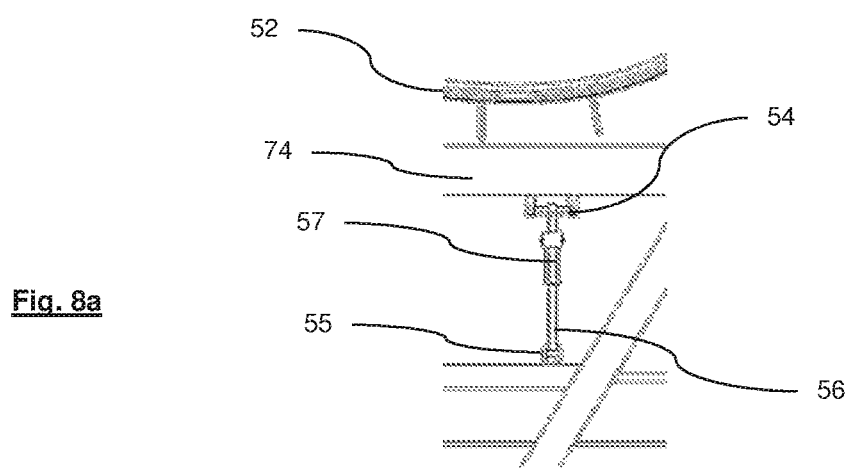
Fig. 8a

TRANSPORT FRAMES FOR A WIND TURBINE BLADE

The present invention relates to the field of storage, transportation and handling of large elongate objects, in particular of wind turbine blades.

In this context, a special set of logistical requirements interacts with a wide variety of technical and cost constraints, to pose technical challenges for effective or optimal solutions. The ever-increasing size and weight of individual blades adds to these challenges. In general, it may be said that after their construction, wind turbine blades undergo a series of handling and storage stages from their production site to their installation location. These stages may include initial storage at a production site, transportation from a production site to an installation site or to an interim storage or marshalling site. There may be further transportation between one or more interim storage or marshalling sites to an installation site. Each interim storage stage may include transferring steps in which blades are lifted off a first transportation platform and on to another, or transfers in and out of storage locations between successive transport steps. One or more transport stages may include sea transport, or rail or truck transport. Storage and handling solutions are sometimes optimised for individual stages of the transition between production and installation. To that end, there may be provided a whole range of support or storage solutions, each individually configured for a particular storage or transport stage and requiring repeated switching between different storage or transport structures. This is costly, time-consuming and can increase the tendency to inflict damage or wear on blades. There can be many advantages arising from devising a blade transport and handling solution which facilitates handling at multiple stages of the transportation process as a whole, including interim storage stages.

The present invention seeks to provide an effective wind turbine blade transport and handling solution which addresses the needs to ensure damage-free transportation of the blades, quick handling during transfers whether between transport platforms or between storage and transportation stages, as well as safety and ease of use by personnel. In aspects, special consideration has been given towards transportation of offshore or onshore blades by shipping. Wind turbine blade support and transportation devices are known in which a frame element is applied at a blade root while another co-operating frame element is provided outboard of a blade root region, often in a mid- or tip region. These may be referred to as root- and tip frames respectively. In some cases, these may be stackable thereby allowing several blades to be supported lying more or less horizontal or slightly inclined, and stacked atop one another. For example, WO2015149809 discloses a stackable frame arrangement in which the tip- and root frame each allows a lateral tilting of a respective root or tip support element, thereby accommodating a possible height difference between the level of the tip frame and the level of the root frame. EP2708731 recites stackable blade frames in which a root support member is supported by a root frame. The root support member is rotatable about a blade lengthwise axis. A tip frame includes a tip clamp, capable of accommodating a tip portion of a blade at different angles of rotation about a blade lengthwise axis. In EP2796709, an alternative arrangement is shown allowing a root frame, fixed to a blade root, to be rotated when a tip clamp at the blade tip is separated from a tip frame. The tip clamp may be received into a tip frame, when it extends in a lateral direction, i.e. when a chordwise extent of the blade, at the tip clamp, extends laterally, generally horizontal.

The present invention sets out to provide improvements to known blade frames.

SUMMARY OF THE INVENTION

To these ends, the present invention provides a transport frame pair configured for transporting a wind turbine blade, the frame pair comprising a tip frame and a root frame, each tip and root frame being stackable with identical frames for blade transport or storage. According to the invention, each frame preferably comprises four upright frame struts or equivalent elements, each preferably extending above and below the height extent of a blade when supported in the respective frame. Each frame thereby defines a three-dimensional, generally cuboid (i.e having six rectangular faces) internal space having a longitudinal extent between two pairs of upright struts. The tip frame comprises a tip saddle assembly preferably wholly enclosed therein. The tip saddle includes a tip saddle preferably disposed on a tip saddle support within the three-dimensional, generally cuboid internal space. The root frame also comprises a root saddle assembly including a root saddle and preferably wholly enclosed within said generally cuboid internal space. The root saddle assembly may additionally include a root saddle support connected to the root saddle. According to the invention, the root frame is configured to prohibit a translation movement, relative to the frame, of the root saddle in a longitudinal direction of a blade supported in the root saddle, whereas the tip frame allows a translation movement, relative to the frame, of the tip saddle in a longitudinal direction of a blade supported therein.

This arrangement ensures that a blade supported in the frame pair does not transmit loads in a longitudinal direction between the tip and root frame. As a consequence, each of a root and tip frame and the supported blade itself are less exposed to stresses during transportation. When stacked, loads or forces in a longitudinal direction of the supported blades are not transmitted between respective tip or root frame stacks. One advantage of this arrangement may be to reduce the need for lashing arrangements between each blade stack and a transportation bed such a load-carrying deck of a ship.

In a preferred aspect, the longitudinal extent of the root frame may be more than twenty percent greater than the corresponding longitudinal extent of the tip frame. This arrangement may have a tendency to increase the inertia or stability of the root frame or stack of root frames. Coupled with the translation action of the tip saddle, this may still further enhance the overall stability of a blade and frame pair or a stacked set of frame pairs with blades supported therein. Consequently, the need for additional lashings, for example on a transportation surface such as a truck or ship may be less. This may reduce time, work and thereby costs during transfer of a blade load onto or off a transport platform such as a shipping vessel or other load-carrying deck. Optionally, the root frame may have a longitudinal extent more than twenty five percent greater than the corresponding longitudinal extent of the tip frame. Optionally, the root frame may have a longitudinal extent more than thirty percent greater than the corresponding longitudinal extent of the tip frame. Optionally, the root frame may have a longitudinal extent more than thirty five percent greater than the corresponding longitudinal extent of the tip frame. Optionally, the root frame may have a longitudinal extent more than forty percent greater than the corresponding longitudinal extent of the tip frame. The greater longitudinal extent of the root frame in relation to the longitudinal extent of the tip frame may increase the overall stability of the frame pair or stack of frame pairs when supporting a blade or several blades.

Preferably, the tip saddle translation movement may be provided by way of a mechanism allowing a sliding action in a longitudinal direction of a blade supported thereon. Hence, in a further, optional aspect, the tip saddle support may be configured to slide or glide along longitudinally extending frame struts. By way of example, a sliding or gliding motion may be facilitated by one or more rollers or low-friction pads between the tip saddle support and one or more longitudinally extending frame struts.

Optionally, the tip saddle support may be provided with a releasable preventer acting between the tip frame and the tip saddle support, and capable of selectively inhibiting or enabling the longitudinal translation movement of the tip saddle in the frame. Preferably, this may be achieved by inhibiting or enabling the aforementioned longitudinal translation movement of the tip saddle support, and thereby also the tip saddle within in the frame. The translation movement of the tip saddle relative to the frame may thereby be selectively impeded. This may be desirable, for example during lifting operations of a blade frame pair with a blade supported therein, or during lifting of a corresponding blade stack. Still alternatively, the longitudinal translation sliding action of the tip saddle may desirably be constrained during a storage stage of a blade or blade stack at a fixed location such as a warehouse or marshalling yard. Conversely, it may on occasion be desirable to store blades or stacks of blades at a fixed location with the tip saddle freely movable in translation, as described, for example in an earthquake zone, to improve stability and avoid stresses on the blade or on any frame or stack of frames, which stresses may arise as a result of earth tremors, minor or otherwise.

Optionally, a releasable preventer may preferably be non-extensible and may comprise a non-rigid or flexible element such as a belt or strap or rope. A preventer may preferably extend between a frame strut, fixed to the frame, and the tip saddle or tip saddle support.

Accordingly, the tip saddle support and/or a strut of the tip frame may comprise an attachment point for a preventer. Preferably a fastening eye may be provided respectively at a said frame strut and at said tip saddle or tip saddle support for this purpose. Preferably, a preventer may be placed in or out of a released configuration or in or out of a restraining configuration, manually by a single operator, optionally without the use of power tools or optionally, without the use of tools.

In a further optional aspect, two struts of the tip frame may each comprise an attachment point for a preventer, each of the two struts being spaced apart in a longitudinal direction of a said blade in the frame and respectively provided on opposite sides of the tip saddle. This arrangement may be especially beneficial in connection with a flexible, inextensible preventer such as a cable, belt or rope or such like, as it may allow to apply a restraining tension force in both directions along a longitudinal axis of a blade.

In further optional aspects, each said upright frame strut of said root frame and tip frame may extend above and below the height extent of a blade when supported in the frame. In particular, each upright frame strut may extend between respective top and bottom connectors configured to connect to an identical frame when stacked respectively above or below.

Optionally, the root saddle may be mounted freely pivotable, in the root frame, about a lateral axis of a blade when supported in the frame. The pivoting action of the root saddle may thereby in particular allow a blade root, when positioned in the root saddle, to move in a pivoting motion relative to the root frame. The pivot axis may in particular extend parallel to an approximate chordwise direction of a blade, when positioned in the frame. The pivot axis may extend parallel to a transverse i.e. lateral or widthwise extent of the frame.

Similarly, in another aspect, the tip saddle may be mounted freely pivotable, on the tip saddle support, about a lateral axis of a blade when supported in the frame. The pivoting action of the tip saddle may thereby in particular allow a blade tip, when positioned in the tip saddle, to move in a tilting motion relative to the tip frame. The pivot axis may in particular extend parallel to an approximate chordwise direction of a blade, when positioned in the frame. The pivot axis may extend parallel to a transverse i.e. lateral or widthwise extent of the frame. Therefore, still preferably, both the tip saddle and the root saddle may optionally be mounted freely pivotable, on their respective supports, about a lateral axis of a blade when supported in the frame pair.

A transport frame pair according to the invention is defined in appended claim 1. Further preferred, optional aspects thereof are defined in subclaims 2-13. Additional preferred, optional aspects are discussed in this specification.

In a further aspect, the invention relates to a method of transporting a wind turbine blade, comprising placing a tip and root portion of the blade in a respective tip and root saddle of a first frame pair according to the invention. The method additionally comprises the steps of fixing the blade root in the root saddle and fixing the blade tip in the tip saddle, and transporting the blade with the tip frame saddle being freely movable in translation, relative to the tip frame, in a longitudinal direction of said blade. In this context, a blade tip-region may extend to the blade mid-region. In other words, a so-called tip-frame may be positioned at a mid- or tip-region of a blade.

By this method, the blade and frame pair may undergo loads or stresses in the longitudinal direction during transportation, without those loads being transmitted to the blade or between the respective frames of a frame pair. By way of example, uneven loads and distortions on a blade and frame pair or on a blade stack can sometimes arise during the course of transportation, such as for example during shipping or during freight transportation by road or rail or by any other means. The method of the invention may improve the stability of a frame pair or stack and/or it may reduce the need for lashing between a frame or frame stack and a transport platform such as the deck of a ship.

Hence, in a further, optional aspect, the method may further include placing a second or subsequent frame pair, including a blade supported therein, atop the first or a previous frame pair and securing the second or subsequent frame pair to the first or a previous frame pair by means of stacking connectors, and transporting the stacked blades with respective tip frame saddles being freely movable in translation, relative to the tip frames, in a longitudinal direction of the stacked blades. Optionally, the method may include the step of releasing a restraining element from a restraining position of the tip saddle prior to transportation of a blade or blade stack. Optionally, the method may include the step of engaging a restraining element from a released to a restrained position of the tip saddle after transportation of a blade or blade stack. The method of the invention is defined in appended claim 14. Further, preferred features are defined in appended claims 15-17.

Additional aspects of the invention including various optional features thereof will be explained with reference to the following non-limiting examples including the following drawings in which:

FIG. 3 shows a perspective view of a tip frame;

FIG. 4 shows a side view of a tip frame;

FIGS. 5a and 5b show perspective views of a tip saddle assembly;

FIGS. 6a and 6b show side views of a tip saddle assembly;

FIG. 7 shows a perspective view of a tip saddle support;

FIG. 8 shows a view from beneath a tip saddle support in a tip frame;

FIG. 8a shows a detail of a tip saddle preventer;

Figure 1:
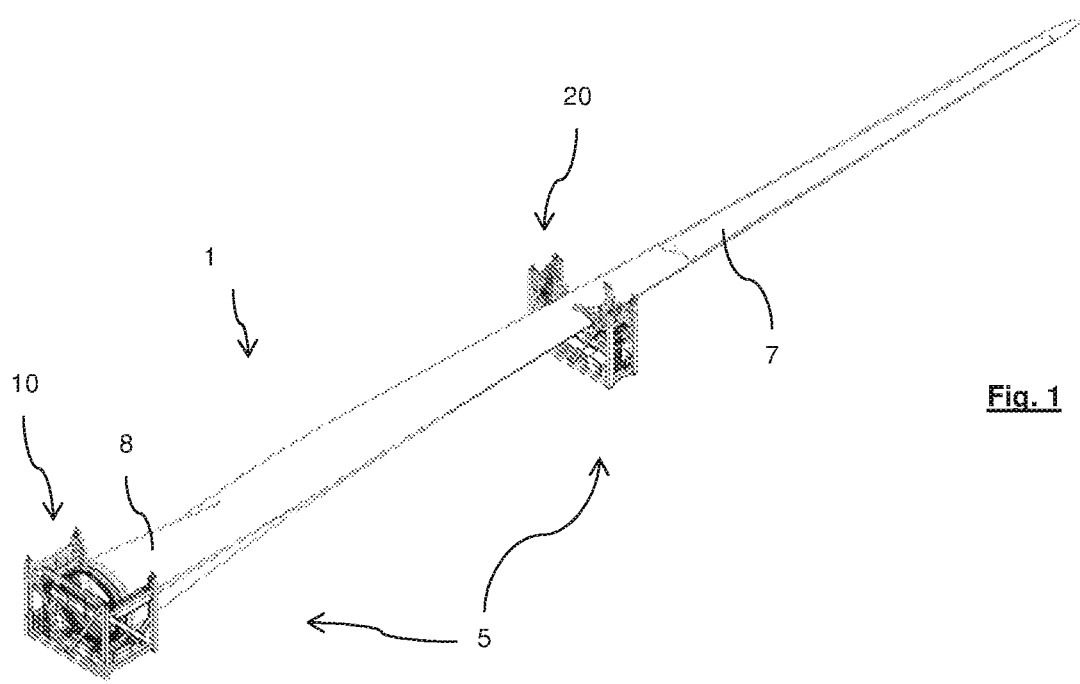
FIG. 1 shows a transport frame pair supporting a wind turbine blade.
Figure 2:
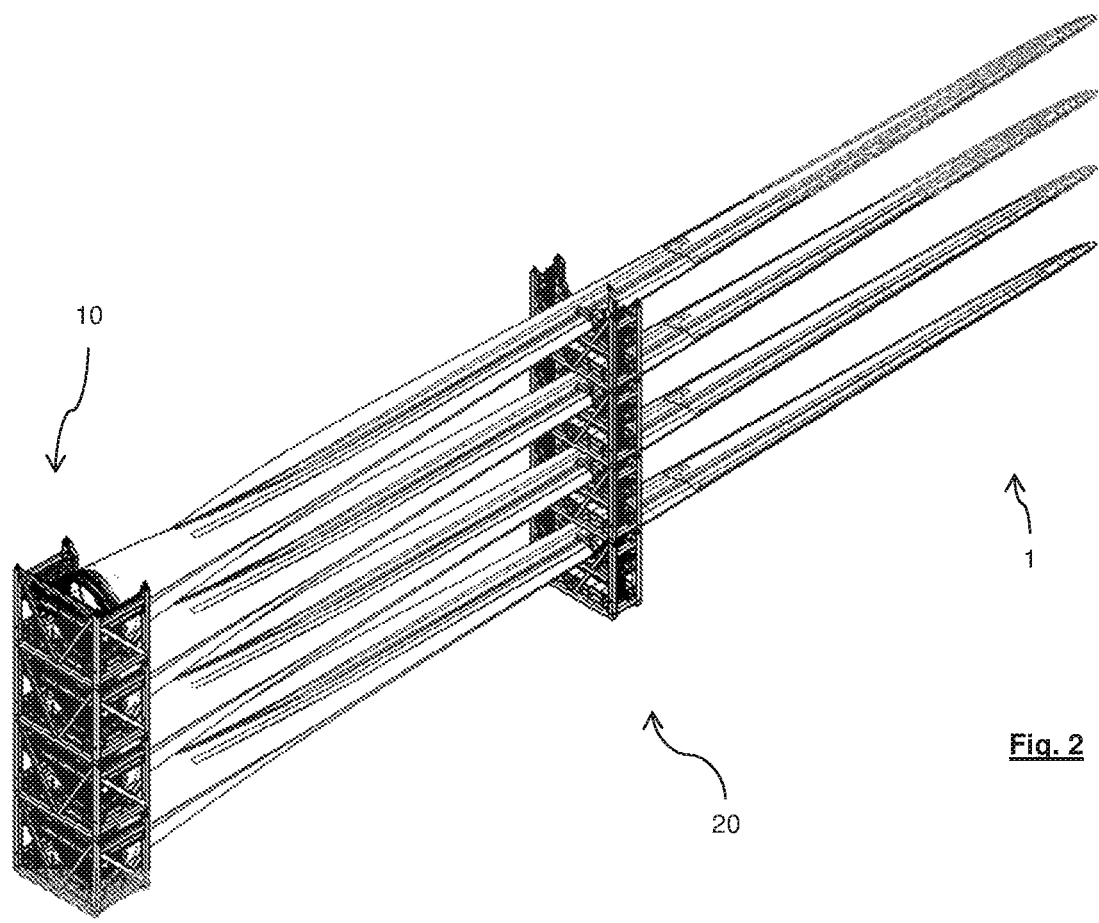
FIG. 2 shows several, stacked wind turbine blades supported in a stack of frame pairs.

FIG. 1 illustrates a frame pair consisting of two frames 5, namely a root frame 10 and a tip frame 20. A wind turbine blade 1 is supported therein in a generally horizontal orientation. A chordwise direction of the blade 1 may also lie generally horizontal when supported in the respective transport frames 5. As is generally understood, the blade 1 extends from a root end at a root region 8 to a tip end at a tip region 7 which may also be correspondingly referred to as a proximal and a distal end respectively. The frames 5 of the frame pair are stackable, as illustrated in FIG. 2. Each root and tip frame 10, 20 includes a respective root saddle 82 and tip saddle 52 as will be described more fully below. In the design illustrated here, each tip and root frame 20, 10 includes a single respective tip- or root saddle 52, 82. Associated with the respective saddle are additional elements for keeping the respective blade root or tip securely in place in the respective frame 10, 20. For the purposes of the present context, the tip region 7 may also denote a mid-region of a blade 1. Expressed differently, a tip frame 20 may be positioned anywhere between a mid- and a tip-region of a blade 1.

FIG. 2 illustrates a stacked arrangement of multiple blades 1, with each blade supported in a frame pair. The stacked arrangement is achieved by stacking the respective root frames 10 on top of each other and the tip frames 20 likewise. To that end, each of the tip frames 20 and root frames 10 is constructed accordingly, as can be seen for example from FIGS. 3 and 9. Preferably, the frame construction in each case includes rigidly connected frame struts, including upright struts 71, 72, 91, 92 extending between a respective root or tip frame base 75, 95 and a respective root or tip frame top 76, 96. Preferably, these respective upright struts 71, 72, 91, 92 may define respective upright extending corner edges of each frame 5. Preferably therefore, respective upright struts may be provided in pairs of proximal upright struts 71, 91 and distal upright struts 72, 92. Lateral struts 74, 94 may extend rigidly between upright struts 71, 91, 72, 92, thereby to define a respective proximal frame portion and a distal frame portion. Lengthwise struts 73, 93 may longitudinally connect respective proximal and distal frame portions. In the example illustrated, lengthwise struts 73, 93 extend between proximal upright struts 71, 91 and distal upright struts 72, 92 or between respective proximal and distal lateral struts 74. The respective frame struts of the tip or root frame 20, 10 thereby define a three dimensional interior space. In the example illustrated here, the tip- and root frame 20, 10 each defines an approximately cuboid interior space inside which a respective tip saddle assembly 50 or root saddle assembly 80 is accommodated. The base 75, 95 of the tip and root frames 20, 10 may describe a substantially rectangular footprint in a lateral and longitudinal plane of the frame.

Figure 9:
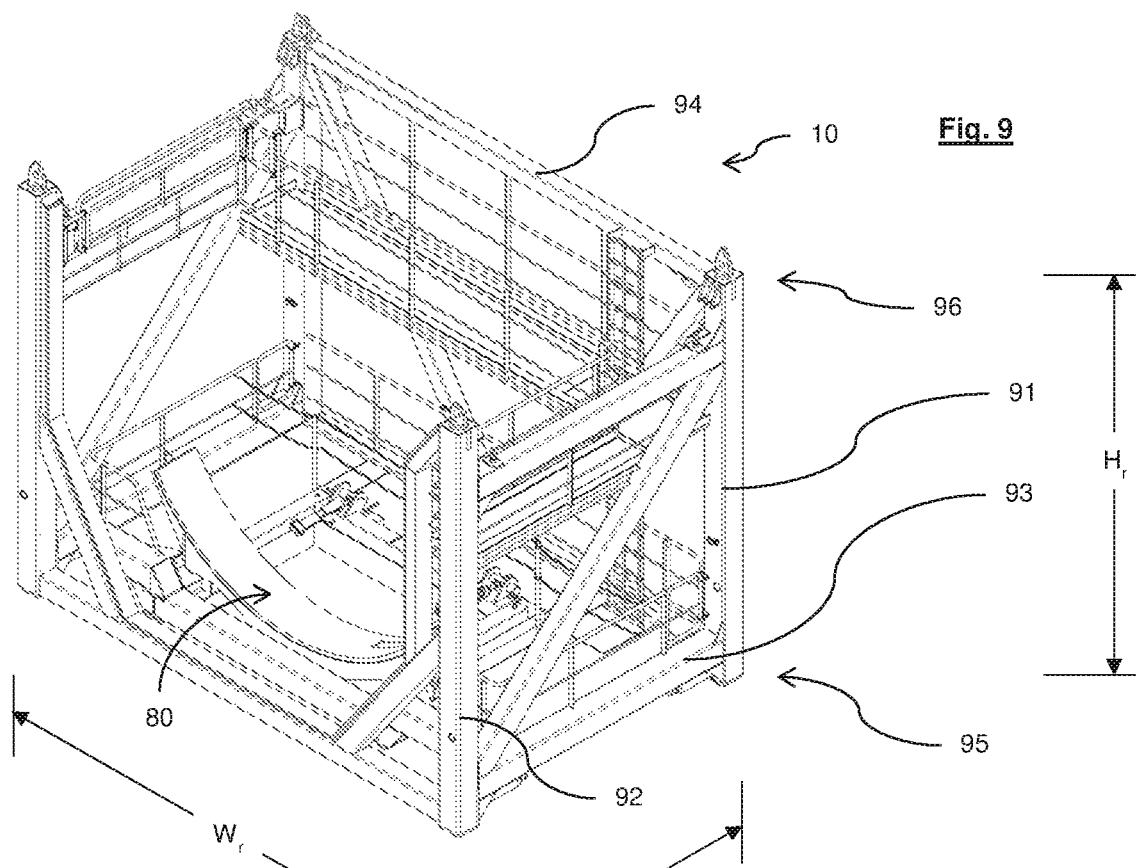
FIG. 9 shows a perspective view of a root frame.

As can be seen from the tip frame 20 illustrated in FIG. 3 and the root frame 10 illustrated in FIG. 9, each frame exhibits a height extent H, a lateral extent W and a lengthwise extent L.

At the top 76, 96 of each tip or root frame 20, 10 there may be provided locating fingers 36 which may co-operate with a recess (not visible in these drawings) at the bottom 75, 95 of the relevant frame. Necessarily, a recess or finger 36 of a first tip or root frame 20, 10 will co-operate to facilitate stacking with the corresponding finger 36 or recess of a similar frame to be stacked atop or beneath.

Stacking frames for storage or stowage, as well as transferring frames off from stacks or onto stacks can be made easier when the effective height dimension $H_t$ of the tip frame 20 of a frame pair is equal to or substantially equal to the effective height $H_r$ of the root frame 10. In this context, the effective height of a frame may correspond to be the distance from a contact surface beneath the frame base 75, 95 on which the frame may rest in e.g. a storage or stowage or transport situation, to the frame top 76, 96, on which a superposed, stacked frame will rest. Preferably, also the effective width dimension $W_t$ of the tip frame 20 of a frame pair may be equal to or substantially equal to the effective width $W_r$ of the root frame 10. In the present context, the effective width of a frame 5 may correspond to the distance between the outermost surface of a proximal 72, 92 or distal 71, 91 pair of upright struts.

FIGS. 3 and 4 show a tip saddle assembly 50 within tip frame 20. The tip saddle assembly 50 comprises a saddle 52 and a saddle support 62. The tip saddle 52 may be configured with a support surface shaped to conform to the shape of a blade surface towards its tip, e.g. in a mid- or tip region thereof. As can better be seen from FIG. 8, the tip saddle assembly 50 may be supported on longitudinally extending frame struts 73. In particular, the tip saddle support 62 may be supported on longitudinally extending frame struts 73. Preferably, the tip saddle 52 may be slidable in translation in a lengthwise direction of the tip frame 20. This in effect corresponds to a movement of the tip saddle 52 in a lengthwise direction of the blade. Preferably, the tip saddle 52 is capable of sliding freely in the aforementioned lengthwise direction.

A free running translation movement of a tip saddle assembly 50 may be provided in particular by a sliding connection between the tip saddle assembly 50 and the tip frame 20. In particular, a tip saddle support 62 may be slidable along a track formed or supported by longitudinally extending frame struts 73. The sliding action may be enhanced by providing low-friction surface strips 64 on the tip saddle support 62 at its contact surfaces with the tip-frame 20. Additionally or alternatively, the tip frame 50 may comprise low-friction surface strips on those surfaces which are contacted by the tip saddle support 62. In the example shown, the tip-saddle support 62 is provided with low-friction strips. Optionally, the tip-saddle support 62 may be provided with one or more rollers 66 which contact the tip frame 50 to reduce friction during a translation movement of the tip saddle support assembly 50 in the tip frame 50. Preferably, the contact surface at the tip frame 50, on which the tip saddle assembly 50 slides, may be a smooth surface.

In the example shown, the tip frame 20 sliding surface is provided on a longitudinally extending strut 73.

In embodiments, the tip saddle 52 may be tiltable on the tip saddle support 62. In particular, the tip saddle 52 may pivot about pivot points 58 aligned on a pivot axis 59 preferably parallel to the lateral dimension W of the tip frame 20. Preferably, the tilt action allows free tilting movement between the tip saddle support 62 and the tip saddle 52, preferably about through an angle of at least five or ten degrees or arc, still preferably at least twenty degrees of arc, still preferably, between five or ten and thirty degrees of arc, still preferably, between fifteen and thirty degrees of arc.

Also shown in FIGS. 3, 4 and 5a are clamping arms 40 for securing the blade mid- or tip-end on the tip saddle 52 in the tip saddle assembly 50. According to aspects of the invention, one or more such clamping arms 40 may be provided in connection with a tip saddle assembly 50, in particular as part thereof. In the example shown, two clamping arms 40 are provided in association with each tip saddle 52 and tip saddle assembly 50. A clamping arm 40 may be opened to allow insertion or removal of a blade into or from a tip frame. A clamping arm 40 may be closed to keep the blade in place. In FIG. 5b, a proximal clamping arm 40 is shown closed, while a distal clamping arm 40 is open. Raising and lowering apparatus may be provided for operating the clamping arms. In particular, the raising and lowering apparatus may be manually operable by an operator to effect opening or closure of a clamping arm 40. The clamping arm 40 may have considerable weight for the purpose of reliably enabling manual lowering into a closed position, in particular enough to overcome the effect of friction resistance to movement in its winch or hinge system. The provision of more than one clamping arm 40 at a tip saddle assembly may allow for larger blades to be effectively clamped in a tip saddle assembly 50 while at the same time keeping each clamping arm 40 down to a size and weight such as to allow manual operation by an operator, preferably using tools such as hand tools and preferably not using power or powered tools.

In aspects of the invention, the tip saddle assembly 50 may be inhibited or blocked against its free translation movement in the tip frame 20. This may be achieved by applying a preventer 56 capable of blocking relative movement between the tip saddle assembly 50 and the tip frame 20. One or more such preventers 56 may be applied, in particular two or more may be applied. The preventer 56 may be rigid such as a locking rod or flexible, such as a preferably inextensible strap, belt, line, cable or rope. In FIGS. 8 and 8a a preventer 56 is shown in the form of a flexible strap. Preferably, a tip-saddle preventer 56 may be attachable to attachment points 55 arranged at the tip saddle assembly 50, preferably at a tip saddle support 62 thereof. A preventer 56 may thus extend at a first end from an attachment point 55 at a tip saddle assembly 50 to another attachment point 55 at a second end of the preventer, the attachment point 55 being at the tip frame 20, optionally at a laterally extending strut 74 thereof. The preventer 56 may be fixed in any suitable way, at respective first and second ends. The preventer 56, may be of inextensible material such as a metallic material or a non-stretch polymeric material such as a polyamide, polyaramid or UHMWP material. The preventer 56 may additionally pass through a fairlead 54 fixed to the tip frame 20. A fairlead 54 may comprise a roller fairlead as illustrated in FIG. 8. In aspects of the invention, a tensioner 57 may be used to apply tension to a flexible preventer 56. When fixed to attachment points 55 respectively at the tip frame 20 and at the tip saddle assembly 50, the preventer 56 may thus be brought under tension, ensuring that a translation movement of the tip saddle assembly 50 is thereby prohibited in at least one direction parallel to a lengthwise axis L of the frame pair. Preferably, an additional preventer 56 of a same or different type may be applied to prevent movement in an opposite direction parallel to a lengthwise axis L of the frame pair. This is illustrated in part in FIG. 8, in which a pair of preventers 56 in the form of strap-type lashings are provided, each pulling in an opposite direction to thereby immobilise the translation movement of the tip saddle assembly 50 and thereby of the tip saddle 52. In one embodiment, a preventer 56 may be attached at first and second, opposite ends to respective attachment points 55 at the tip saddle assembly 50 and at the tip frame 20. In this arrangement, the preventer 56 may be applied by tensioning it, with the tip saddle 52 in its desired location in the tip frame 20. It may be released by releasing the tension, thereby freeing the tip saddle assembly 52 to move in the lengthwise direction of the tip frame 20. In addition, in embodiments, a preventer 56 may comprise a disengageable connector at either or both its first and second ends. The preventer 56 may thereby be disengaged from the attachment points 55 at one or both ends thereof. In embodiments, a preventer 56 may thereby be removably attachable to the tip frame 20. In one aspect, a disengageable connector at a preventer 56 may comprise a hook (not shown) capable of being engaged with or disengaged from an attachment point 55. In embodiments, a preventer 56 may comprise a hook at a first and second end thereof capable of being disengageably connected to a respective attachment point 55 at a tip frame strut and at a tip saddle assembly 50. Preferably the application or disengagement of a preventer 56 may be carried out manually by an operator. Preferably the act of tensioning a preventer 56 may be carried out manually by an operator. Preferably either or both actions may be performed without power tools.

FIG. 8a illustrates a tensioner 57 in the form of a ratchet lever provided as part of the preventer 56. In aspects of the invention, the preventer may be removably connected to the tip frame 20. Hence, the application of a preventer 56 may include engaging the preventer 56 with the tip frame 20 prior to applying tension thereto. Preferably, a respective first and second preventer 56 are applied to the tip frame and tensioned to thereby prevent translation movement of a tip saddle 52 in both directions along the axis of movement of the tip saddle assembly 50 in the tip frame 50.

Figure 9A:
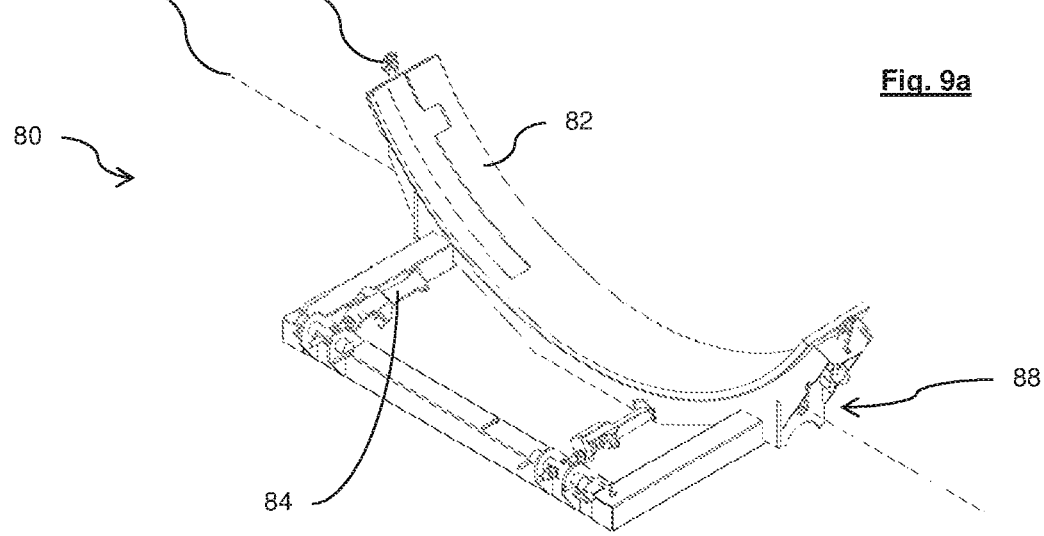
FIG. 9a shows a detail of a root saddle assembly.

As shown in FIGS. 9 and 9a, a root saddle assembly 80 is provided in a root frame 10 of a frame pair. The root saddle assembly 80 is in particular connected to the root frame 10 in such a way that translation movement of the root saddle assembly 80 relative to the root frame 10 is excluded. A root saddle 82 may be configured with a support surface shaped to conform to the shape of a blade surface at its root. The root saddle 82 may thereby appropriately have an arcuate blade root support surface. In the example shown, the root saddle 82 may be tiltable in the root frame 20. To that end, the root saddle assembly 80 may be pivotable about one or more pivot points aligned along a laterally extending pivot axis 89 which may extend parallel to a lateral extent W of the root frame 10. The root saddle assembly 80 may include clamps or clamp attachments or other fittings for securely holding the blade root in the root saddle 80. These may be in the form of brace attachments 83 and/or in the form of root restrainers 84. The root restrainers 84 may in particular be configured to be attached to stud-bolts protruding from a blade root and thereby prohibit longitudinal movement of a blade 1 in a root frame 10.

The combined effect of the tip saddle 52 being capable of free translation movement in a longitudinal direction of a blade 1 in a tip frame 20 while longitudinal movement of a blade in a root frame 10 is inhibited, is to dissipate lengthwise loads or forces on the blade in the root frame 10 or root frame stack, and substantially to prevent those loads from being transmitted to the tip frame 20 or tip frame stack. This may have the beneficial effects of reducing stresses on the blade 1 during transportation and at the same time, reducing the requirement for lashing a tip frame or tip frame stack to a transport surface such as the deck of a shipping vessel or a truck bed. This may speed up transportation and transfer logistics while reducing material and labour costs.

In accordance with aspects of the invention, it is preferred for the root frame 10 of a pair to have an effective length $L_r$ greater than the effective length $L_t$ of the tip frame 20. In this context, the effective length of a frame 10, 20 may correspond to the distance between the most proximal surface of a proximal upright strut 72, 92 and the most distal surface of a distal upright strut 71, 91. Still preferably, the effective length $L_r$ of the root frame 10 of a frame pair may be at least twenty percent greater than the effective length $L_t$ of the tip frame 20. Still preferably, the effective length $L_r$ of the root frame 10 of a frame pair may be at least thirty percent greater than the effective length $L_t$ of the tip frame 20. Still preferably, the effective length $L_r$ of the root frame 10 of a frame pair may be at least forty percent greater than the effective length $L_t$ of the tip frame 20. The stability of a root frame 10 or root frame stack may thereby be further enhanced. Moreover, the overall stability of a frame pair or of stacked frame pairs may thereby be enhanced owing to the increased propensity for load dissipation through the root frame 10 or root frame stack while underway. The larger lengthwise dimension of a root frame 10 may furthermore reduce the need for lashings between a transport surface and a root frame 10 or root frame stack. In this context, it may be appreciated that the internal volume defined by a tip frame 20 may preferably be at least twenty percent less or at least thirty or forty percent less than the internal volume defined by a root frame 10.

According to further aspects, a tip frame 20 may be configured such that a lateral translation movement of a tip saddle 52 in the frame 20 is prohibited.

The examples illustrated herein show a variety of optional features not all of which need to be combined together in the context of the invention. On the other hand, all and any recited features may be combined together unless prevented by the laws of physics or unless manifestly impossible for another reason.

The invention claimed is:

1. A transport frame pair configured for transporting a wind turbine blade,
   said frame pair comprising a tip frame and a root frame, each said tip and root frame being stackable with identical frames for blade transport or storage,
   each one of said tip and root frame comprising four upright frame struts which together define a generally cuboid internal space having a longitudinal extent between two pairs of said upright struts;
   said tip frame comprising a tip saddle assembly within said generally cuboid internal space, and
   said root frame comprising a root saddle assembly within said generally cuboid internal space, and
   wherein said root frame is configured to prohibit a translation movement of said root saddle assembly in a longitudinal direction of a blade supported in a root saddle of said root saddle assembly; and
   wherein said tip frame allows a translation movement of said tip saddle assembly in a longitudinal direction of a blade supported in a tip saddle of said tip saddle assembly.

2. The transport frame pair according to claim 1, wherein said longitudinal extent of said root frame is more than twenty percent greater than the longitudinal extent of said tip frame.

3. The transport frame pair according to claim 1, wherein said tip saddle assembly is configured to slide along longitudinally extending frame struts.

4. The transport frame pair according to claim 3, wherein said sliding motion is facilitated by low-friction pads between a tip saddle support of said tip saddle assembly and said longitudinally extending frame struts.

5. The transport frame pair according to claim 1, wherein a tip saddle support of said tip saddle assembly is provided with a releasable preventer acting between said tip frame and said tip saddle support, and capable of selectively restraining or enabling said longitudinal translation movement of said tip saddle.

6. The transport frame pair according to claim 5, wherein said releasable preventer comprises a belt or strap.

7. The transport frame pair according to claim 5, wherein said tip saddle support and a strut of said tip frame each comprise an attachment point for a said preventer, and wherein said preventer preferably includes a tensioner preferably in the form of a ratchet lever.

8. The transport frame pair according to claim 7, wherein two said struts of said tip frame each comprise an attachment point for a said preventer, each of said two struts being spaced apart in a longitudinal direction and respectively provided on opposite sides of said tip saddle.

9. The transport frame pair according to claim 1, wherein each said upright frame strut extends above and below the extent of a blade when supported in said frame.

10. The transport frame pair according to claim 9, each said upright frame strut extending between respective top and bottom connectors configured to connect to an identical frame stacked respectively above or below.

11. The transport frame pair according to claim 1, said root frame having a longitudinal extent more than twenty five percent greater than the longitudinal extent of said tip frame, preferably said root frame having a longitudinal extent more than thirty percent greater than the longitudinal extent of said tip frame, preferably said root frame having a longitudinal extent more than thirty five percent greater than the longitudinal extent of said tip frame, preferably said root frame having a longitudinal extent more than forty percent greater than the longitudinal extent of said tip frame.

12. The transport frame pair according to claim 1, wherein said root saddle assembly is mounted pivotable, in said root frame, about a lateral axis of a blade supported in said frame, and wherein said pivoting action of said root saddle assembly allows a blade root, when positioned in said root saddle, to move in a pivoting motion relative to said root frame.

13. The transport frame pair according to claim 1, wherein said tip saddle is mounted pivotable, on a tip saddle support of said tip saddle assembly, about a lateral axis of a blade supported in said frame, and wherein said pivoting action of said tip saddle allows a blade tip, when positioned in said tip saddle, to move in a tilting motion relative to said tip frame.

14. A method of transporting a wind turbine blade, comprising placing a tip and root portion of said blade in a respective tip and root saddle of a first frame pair according to any claim 1, fixing said root in said root saddle and fixing said tip in said tip saddle, and transporting said blade with said tip frame saddle being freely movable in translation, relative to said tip frame, in a longitudinal direction of said blade.

15. The method according to claim 14, further including placing a second or subsequent frame pair, including a blade supported therein, atop a said first or a previous frame pair and securing said second or subsequent frame pair to said first or a previous frame pair by means of said stacking connectors, and transporting said stacked blades with respective said tip frame saddles being freely movable in translation, relative to said tip frames, in a longitudinal direction of said stacked blades.

16. The method according to claim 14, further comprising applying a movement preventer to inhibit said translation movement between said tip saddle and said tip frame prior to placing said blade in said tip frame and releasing said preventer prior to transporting said blade in particular aboard a vessel.

17. The method according to claim 16, further comprising re-applying said preventer after transportation, in particular, after transportation aboard a said vessel and prior to unloading or unstacking a set of frame pairs.

\* \* \* \* \*